(12) United States Patent
Simpson

(10) Patent No.: US 12,033,362 B2
(45) Date of Patent: Jul. 9, 2024

(54) SYSTEM AND METHOD FOR COMPRESSING A CAPTURED IMAGE OF A MAILPIECE OR PARCEL

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/362,298

(22) Filed: Jul. 31, 2023

(65) Prior Publication Data

US 2024/0020888 A1 Jan. 18, 2024

Related U.S. Application Data

(63) Continuation of application No. 17/131,191, filed on Dec. 22, 2020, now Pat. No. 11,756,236.

(60) Provisional application No. 62/952,813, filed on Dec. 23, 2019.

(51) Int. Cl.
  *G06T 9/20* (2006.01)
  *B07C 3/14* (2006.01)
  *G06T 7/13* (2017.01)
(52) U.S. Cl.
  CPC ............... *G06T 9/20* (2013.01); *B07C 3/14* (2013.01); *G06T 7/13* (2017.01)

(58) Field of Classification Search
  CPC ..... G06T 9/20; G06T 7/13; B07C 3/14; H04N 19/88
  See application file for complete search history.

(56) References Cited

U.S. PATENT DOCUMENTS 5,208,872 A * 5/1993 Fisher .................. G06T 3/18
  382/300
11,348,269 B1 5/2022 Ebrahimi Afrouzi et al.

FOREIGN PATENT DOCUMENTS

KR 10-2002-0058238 A 7/2002

\* cited by examiner

*Primary Examiner* — Christopher Wait
(74) *Attorney, Agent, or Firm* — Knobbe Martens Olson & Bear LLP

(57) ABSTRACT

This application relates to a system for compressing captured images. The system may include an image capturing device configured to continuously capture images, for example, of a location, or frame, or field of view, and convert the captured images respectively into a plurality of sets of digital data, each of the plurality of sets of digital data including at least two consecutive rows of digital data. The system may also include a processor circuit configured to combine the at least two sets of the plurality of sets of digital data to generate a pre-compression set of digital data and simultaneously compress the pre-compression set of digital data simultaneously or together in a single compression operation.

20 Claims, 14 Drawing Sheets

SYSTEM AND METHOD FOR COMPRESSING A CAPTURED IMAGE OF A MAILPIECE OR PARCEL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 17/131,191, filed Dec. 22, 2020, which claims priority to and the benefit of Provisional Application No. 62/952,813 filed on Dec. 23, 2019 in the U.S. Patent and Trademark Office, the entire contents of each of which are incorporated herein by reference.

BACKGROUND

The described technology generally relates to image processing, and in particular to a system and method for compressing a plurality of captured images.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for image encryption through dynamic compression code words.

One aspect is a system for compressing a captured image of a mailpiece or parcel, comprising: an image capturing device configured to continuously capture images of a plurality of mailpieces or parcels being transported, and convert the captured images respectively into a plurality of sets of digital data, each of the plurality of sets of digital data including at least two consecutive rows of digital data; and a processor circuit configured to combine the at least two sets of the plurality of sets of digital data to generate a pre-compression set of digital data and compress the pre-compression set of digital data simultaneously or together in a single compression operation.

In the above system, the pre-compression set of digital data comprises a single row of digital data or a single file each including the at least two sets of the plurality of sets of digital data. In the above system, the pre-compression set of digital data comprises at least one mailpiece or parcel identifier bit configured to identify a border of two adjacent ones of the plurality of sets of digital data respectively corresponding to the plurality of captured images. In the above system, the at least one mailpiece or parcel identifier bit is positioned at the beginning or end of the pre-compression set of digital data. In the above system, the at least one mailpiece or parcel identifier bit comprises a plurality of mailpiece or parcel identifier bits disposed immediately before or after the digital data of each of the plurality of sets of digital data.

In the above system, the pre-compression set of digital data does not include a mailpiece or parcel identifier bit, and wherein the processor circuit is configured to store information indicating a border of two adjacent ones of the plurality of sets of digital data. In the above system, the processor circuit is configured to compress the pre-compression set of digital data using a variable length compression method. In the above system, the processor circuit is further configured to sort the converted plurality of sets of digital data by pixel density and compress the sorted sets of digital data simultaneously or together in a single compression operation. In the above system, the processor circuit is further configured to group the plurality of captured images or converted plurality of sets of digital data by similarity and compress the grouped sets of digital data simultaneously or together in a single compression operation.

Another aspect is a system for compressing a captured image of a mailpiece or parcel, comprising: an image capturing device configured to capture an image of a mailpiece or parcel being transported, and convert the captured image into a set of digital data including a plurality of rows of digital data; and a processor circuit configured to combine the plurality of rows of digital data to generate a pre-compression set of digital data and compress the pre-compression set of digital data simultaneously or together in a single compression operation.

In the above system, the pre-compression set of digital data comprises a single row of digital data or a single file each including the set of digital data. In the above system, the single row of digital data comprises at least one mailpiece or parcel identifier bit configured to identify a border of two adjacent ones of the plurality of rows of digital data. In the above system, the pre-compression set of digital data comprises at least one row identifier bit configured to identify a boarder of two adjacent rows of the plurality of rows of digital data corresponding to the captured image.

Another aspect is a method of compressing a captured image of a mailpiece or parcel, comprising: capturing images of a plurality of mailpieces or parcels that are being transported; converting the captured images respectively into a plurality of sets of digital data, each of the plurality of sets of digital data including two or more rows of digital data; combining, at a processor circuit, at least two sets of the plurality of sets of digital data to generate a pre-compression set of digital data; and compressing, at the processor circuit, the pre-compression set of digital data simultaneously or together in a single compression operation.

The above method further comprises: sorting the converted plurality of sets of digital data by pixel density or grouping the plurality of captured images or converted plurality of sets of digital data by similarity; and compressing the sorted sets of digital data or grouped sets of digital data simultaneously or together in a single compression operation.

Another aspect is a method of compressing a captured image of a mailpiece or parcel, comprising: capturing an image of a mailpiece or parcel being transported; converting the captured image into a set of digital data including a plurality of rows of digital data; combining, at a processor circuit, the plurality of rows of digital data to generate a pre-compression set of digital data; and compressing, at the processor circuit, the pre-compression set of digital data simultaneously or together in a single compression operation.

In the above method, the pre-compression set of digital data comprises a single row of digital data or a single file each including the set of digital data. In the above method, the single row of digital data comprises at least one mailpiece or parcel identifier bit configured to identify a border of two adjacent ones of the plurality of rows of digital data.

Another aspect is a method of decompressing a compressed digital data of a captured image of a mailpiece or parcel, comprising: receiving or retrieving compressed digital data of captured images of a plurality of mailpieces or parcels; identifying a compression method used by which the digital data has been compressed; obtaining item identifier information configured to provide a border of two adjacent ones of the plurality of sets of digital data respectively corresponding to the plurality captured images; and decompressing, at a processor circuit, the compressed digital data based on the identified compression method and the item identifier information.

In the above method, the obtaining comprises retrieving one or more item identifier bits from the compressed digital data. In the above method, the obtaining comprises receiving a control message that contains the item identifier information over a communication network. In the above method, the obtaining comprises retrieving the item identifier information from a memory.

Another aspect is a method of decompressing a compressed digital data of a captured image of a mailpiece or parcel, comprising: receiving or retrieving compressed digital data of a captured image of a mailpiece or parcel; identifying a compression method used by which the digital data has been compressed; obtaining row identifier information indicating a boarder of two adjacent ones of the plurality of sets of digital data corresponding to the captured image; and decompressing at a processor circuit, the compressed digital data based on the identified compression method and the retrieved row identifier bits.

In the above method, the obtaining comprises retrieving one or more item identifier bits from the compressed digital data or receiving a control message that contains the item identifier information over a communication network.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 6A, FIG. 6B and FIG. 6C are conceptual diagrams showing a data compression operation for a captured image of a mailpiece or parcel according to some embodiments.

DETAILED DESCRIPTION

Figure 1:
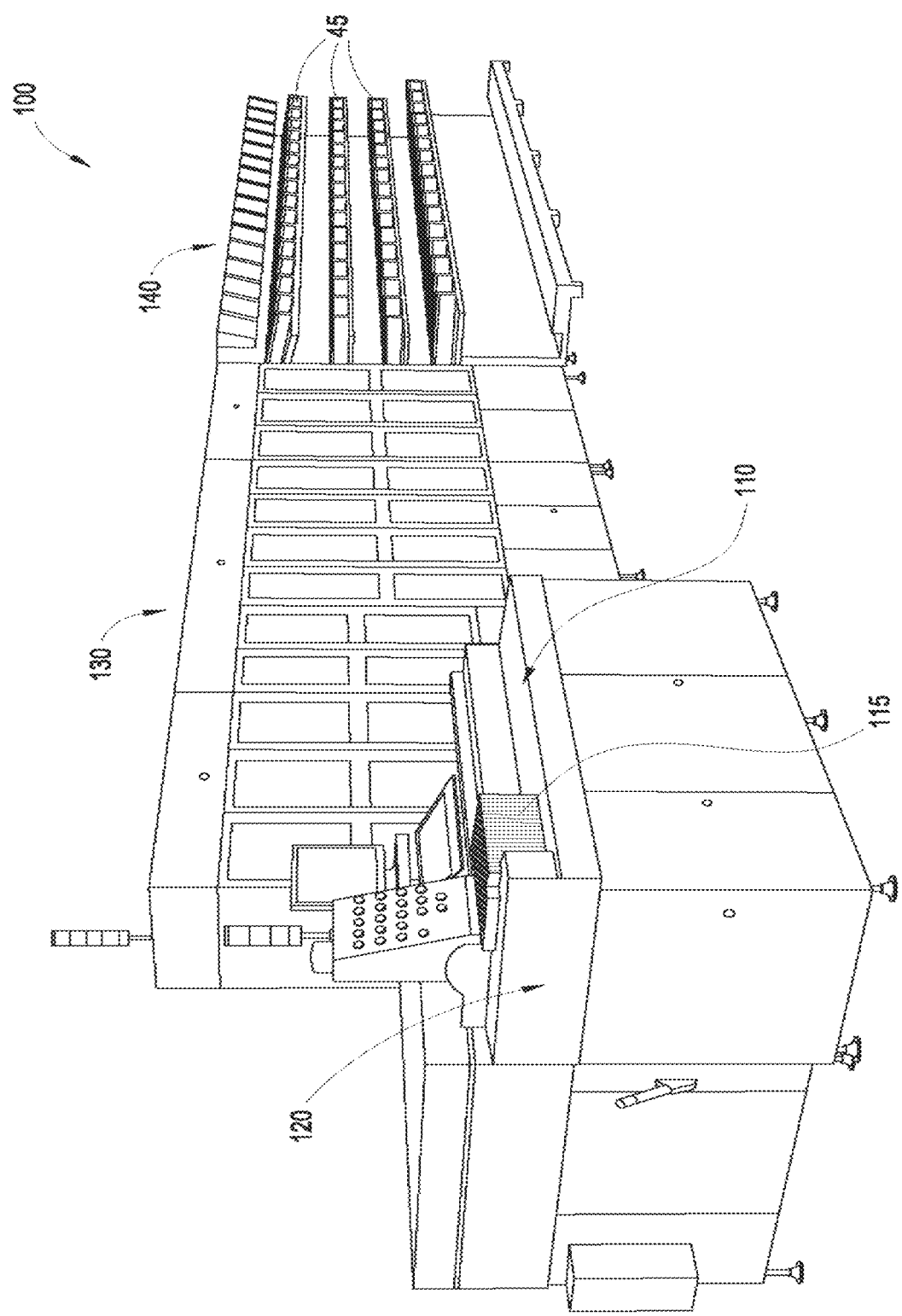
FIG. 1 illustrates an example of sorting/sequencing equipment that may be used in an item processing facility.

Provided herein are various embodiments of systems and methods for image processing including, for example, a system and method for compressing digital data (pixel data) of a captured image of a mailpiece or parcel simultaneously or together in a single compression operation (hereinafter "simultaneously" and "together in a single compression operation" to be interchangeably used with each other, or one of the phrases to cover both). Another embodiments provide a system and method for compressing digital data of stacked captured images of mailpieces or parcels simultaneously or together in a single compression operation. In some embodiments, captured images or digital data thereof may be sorted by density or grouped by similarity before compression. Various embodiments can significantly improve a compression efficiency, a communication efficiency of compressed data and save a memory space so that the functionality of computing devices is significantly improved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

As used here, the term "compress" or "compression" generally refers to generating a data file that takes a smaller quantity of memory than an original, uncompressed data file. Compressing image files retains at least a portion of the visual information of the original image data. As such, with an appropriate viewing application, a user may open a compressed file to view the image data. The resource may include one or more of: memory, network bandwidth, network packets, memory blocks, processor cycles, time to write to memory (e.g., disk), time to read from memory, or the like. Compression may include generating a compressed file from an uncompressed file by reducing the number of bits needed to represent the same information. In some embodiments, compression may include losing some clarity from the original image, such as image resolution or color range, to achieve the resource savings. Such compressions may be referred to as lossy compression. Compression with no clarity loss may be referred to as lossless compression. As used here, the term "decompress" or "decompression" generally refers to reversing the compression process to reconstruct a file to present the original file information. As discussed, the reconstruction may not be an identical reconstruction of the original file as some compression schemes are lossy.

Where a plurality of images are captured, large volumes of data are created. This can be the case in various applications, such as recording video, photographing items, such as archives, and other applications where multiple images are being captured. A large amount of data is generated when handling items through processing systems. Handling items can include capturing one or more images of the item as it is being processed. For example, items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. Sorting items or articles can be done using imaging technologies. The ability to accurately process a given item may be limited by the effectiveness of the imaging technology to extract accurate information about each item. The information may include personal information about the sender or receiver of the item such as name, address, account information, or other information that is provided in trust that public disclosure will be limited if not avoided altogether. Careful handling of the personal information includes careful handling of images taken of the item during processing. Mail delivery is one example of an industrial application that relies on sorting and processing large quantities of items. Others may include, but are not limited to, retail operations with large inventories and high daily sales, high volume component manufacturers, such as consumer goods, baggage sorting, and importing operations with high volumes of imports needing sorting and receiving daily.

Mail piece or parcel items are sorted and the information (e.g., addresses, types of items, barcode, etc.) about them are scanned in an item processing facility. Thus, hereinafter, a description about the item processing facility will be provided first. A processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, or otherwise interpret a destination end point from each item processed. The destination end point may be encoded in a computer readable code, such as a bar code printed on or affixed to the item. In some embodiments, the destination end point may be read by taking an image of the item and performing an optical character recognition (OCR) process on the image, and determining the delivery end point from the OCR'd address. In some embodiments, the item processing equipment can apply a computer readable code that encodes the delivery end point and may print or spray the computer readable code onto the item. In some embodiments, the processing facility uses sorting/sequencing apparatuses which can process over about 30,000 items per hour.

FIG. 1 illustrates an example of item processing equipment 100 that may be used in item processing facilities. Although one type of item processing equipment is depicted in FIG. 1, the current disclosure is not limited thereto. The systems and methods described here can be applicable to the illustrated type and other types of item processing equipment without departing from the scope of the current disclosure. The item processing equipment 100 includes an intake system 110. The intake system 110 may be a counter, conveyor, or other receiving structure where a stack of items 115, such as letters, are brought to be fed into the item processing equipment 100. The intake system 110 may provide a surface or surfaces on which to place the stack of items 115 to stage the items for processing. The item processing equipment 100 has a scanning portion 120 that includes a scanner (e.g., 420 in FIG. 4) which scans or reads a computer readable code or performs OCR of an image of part or all of an item 115 in order to identify various characteristics of the item(s) 115, such as class of service, addressee, and/or delivery end point. The item processing equipment 100 includes a processor (not shown) configured to control the operation of the sorter/sequence 100, including controlling the movement of items through the item processing equipment 100 via conveyor belts, pinch belts, and/or motors, controlling the scanning portion 120 to facilitate the intake, sorting, and sequencing the items 115. The processor is in communication with a memory (not shown) where information from the scanner is stored for further use. The memory can be part of the item processing equipment 100, or may be remote to the item processing equipment 100. The memory may be on a network with which the processor can communicate, and the memory may be shared by different components within a processing facility. The memory is configured to store the identity of each article processed, including information scanned, read, or interpreted from the letter, such as delivery end point, sender, class of service, postage, serial number, and the like. The memory is also configured to store the sequence of items in the item stream as they are scanned.

The item processing equipment 100 further includes a sorting portion 130. The sorting portion 130 may be a large storage and conveyor cabinet as shown, which has inside various components (not shown), for directing items 115 along particular pathways as the items 115 are sorted. The sorting portion 130 may be located adjacent to or otherwise near the intake system 110. In some embodiments, the items 115 may be moved or transported from the intake system 110 to the sorting portion 130 by an automated system including series of pinch belts, vacuum belts, or other conveying mechanisms. As the items are moved or transported from the intake system 110 to the sorting portion 130, the items are read or scanned, and destinations identified for each individual item 115. The processor then operates a system of motors, conveyors, and pinch belts to direct the item to the output portion 140.

The output portion 140 may be a structural system having a plurality of stackers, receptacles, pockets, output areas, or bins 45 arrayed, in some embodiments, in vertically disposed rows. Each bin 45 is configured to receive one or more items 115 from the sorting portion 130. Each bin 45 can be assigned to a particular delivery route or to one or more stop groups.

Figure 2:
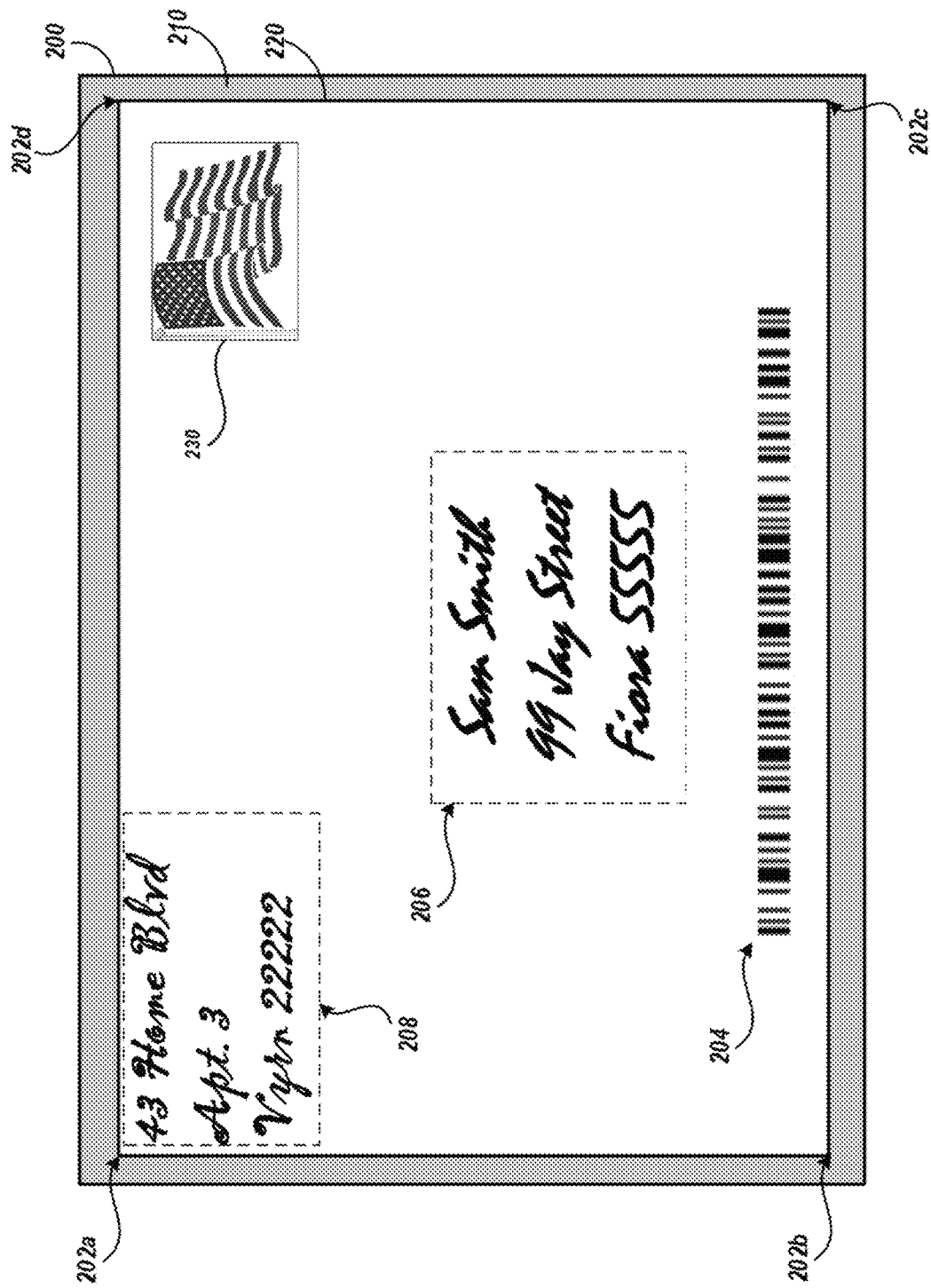
FIG. 2 illustrates an example image showing an item that may be processed in an item processing facility.

FIG. 2 illustrates an example image showing an item that may be processed by the system shown in FIG. 1. The image 200 may include a background region 210 and image data showing an item 220. It will be appreciated that in some embodiments, the image 200 may show only a portion of the item 220, such as a portion of one side of a parcel or a letter. The image analysis may include feature detection. Feature detection generally describes processing an image to identify specific characteristics shown (e.g., features). The characteristics may be used to generate a conclusion about the image (e.g., orientation, content, etc.). For example, the image 200 may depict corners 202a, 202b, 202c, and 202d. The corners 202a-202d may be detected based on a detected contrast between the image data showing the item 220 and the background region 210. In some embodiments, this may be referred to as edge detection. Once the corners or other features are detected, the distance between the detected features may be calculated. Using the ratio of differences between distances, for example, the short side of a letter may be distinguished from the long side of the letter. This can then be used to orient the image, such as where the long side is shown perpendicular to the bottom of the image 200. Angles formed between detected features may be used in addition or as an alternative identification means. For example, an angle between a corner (e.g., the corner 202a) and a corner of the image 200 may be compared. This can provide an indication of whether the image data showing the item 220 is rotated and, if so, by how much.

Feature detection may also identify regions of content within the image 200 such as a return address region 208, a mailing address region 206, a barcode 204, or postage region 230. The location of these regions relative to each other, the corners, or within the image 200 itself may be used to identify characteristics of the item shown in the image 200.

A classification model or algorithm in machine learning can be used for the feature detection. Generally, a classification model is a supervised learning approach in which a computer program learns from data input given to it and then uses this learning to classify new observation. This data set may simply be bi-class (like identifying whether the mail is spam or non-spam) or it may be multi-class too. Some examples of classification problems are: speech recognition, handwriting recognition, bio metric identification, document classification etc. Types of classification algorithms in machine learning include, but not limited to, linear classifiers, logistic regression, Naive Bayes classifier, nearest neighbor, support vector machines, decision trees, boosted trees, random forest and neural networks.

For example, a classification model may be trained using distances between a region and the corners of the item. The distances may be calculated from the center of the region to the respective corner. The distances may be collected as a vector of values and provided to the classification model. Using the vector, the classification model may provide a classification for the region (e.g., return address, mailing address, postage, barcode, unknown). The classification model may also provide a confidence indicating a confidence that the resulting classification is the "correct" classification.

The analysis may also include character recognition. The character recognition may identify specific characters shown in the image 200 such as the ZIP code, street address, type of mailer used for the item (e.g., pre-paid envelope or box), or similar identifying marks that can be identified in the image 200.

Figure 3:
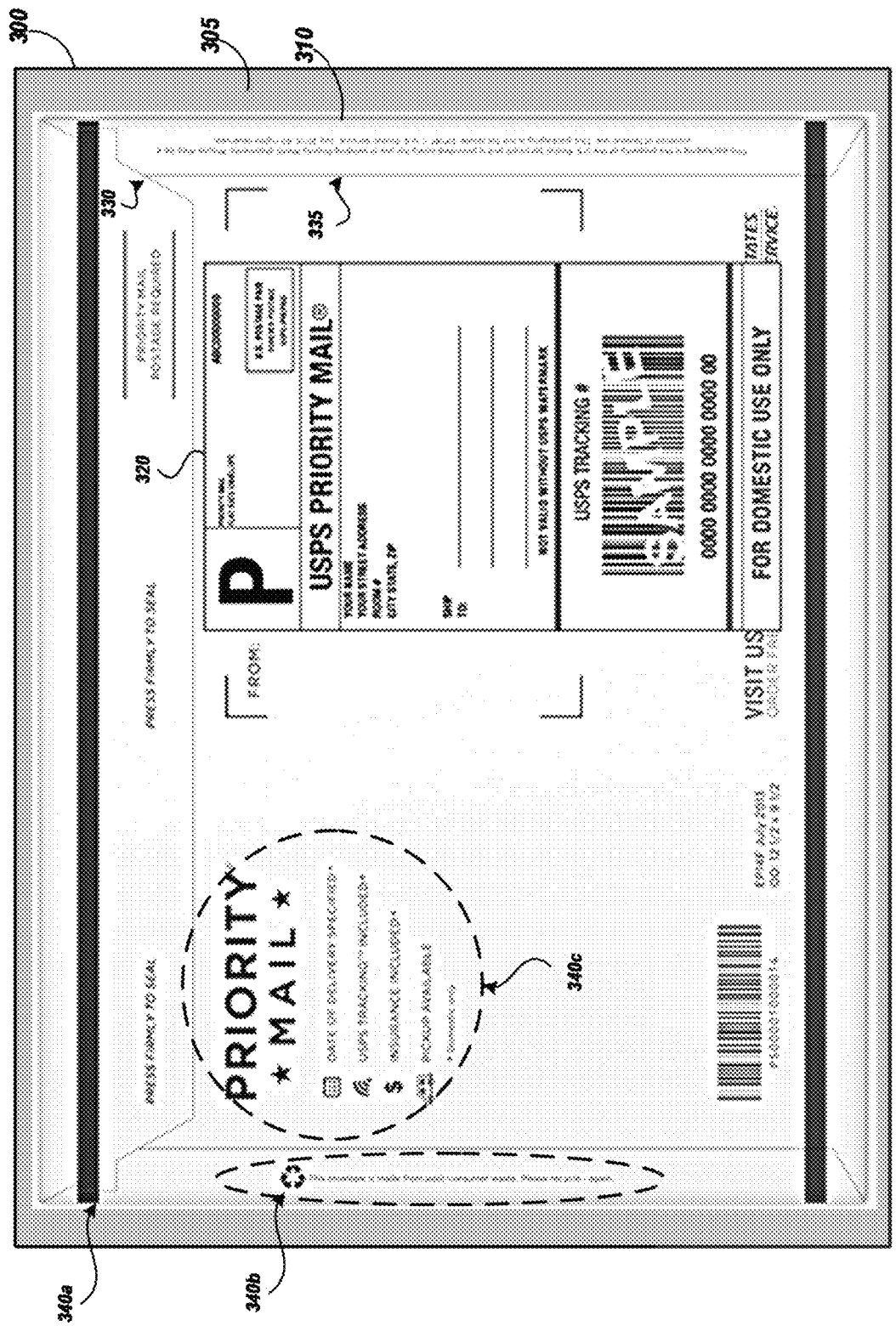
FIG. 3 illustrates another example image showing another item that may be processed in an item processing facility.

FIG. 3 illustrates another example image showing another item that may be processed in an item processing facility. The item 310 shown in FIG. 3 is an example of a pre-printed U.S. POSTAL SERVICE® PRIORITY MAIL® envelope. The image 300 may include a background region 305 upon which the item 310 is imaged. The background region 305 may show processing equipment upon which the item 310 is placed.

The image 300 showing the item 310 may depict identifying marks such as graphics 340a, 340b, or 340c. The graphics may appear at predetermined locations on the envelope and thus can be used as features for identifying the item 310 or orientation thereof. The image 300 may depict construction artifacts for the envelope such as a first seam 330 or a second seam 335. The location or orientation of the seams within the image, within the portion of the image showing the envelope, relative to each other, or relative to another feature identified in the image data 300 may be used to identify the envelope or orientation thereof.

The image 300 may show a printed label 320. The printed label 320 may include sorting, processing, and routing information (e.g., recipient mailing address, sender address, class of service, tracking number, postage payment, etc.) in a region of interest. In such instances, the location of the printed label 320 may be identified based on the identified features. In some embodiments, the printed label 320 may serve as a feature. The fields and lines of the printed label 320 can be used alternatively or in addition to other indicia. For example, the pattern of boxes and lines on the labels may be standardized, so those lines can be used to identify where the regions of interest are, and for orientation purposes. Consider a label having a specific pattern of horizontal lines from top to bottom in the label. If that pattern is detected in the image as vertical lines, or if the pattern is inverse, then the image may be identified as oriented sideways or upside down from a desired orientation.

Other types of items, such as parcels, flats, and the like, will have their own specific identifying marks that can be used to orient the image of the label or of regions of interest. Although not specifically described here, a person of skill in the art, guided by this disclosure, will understand how to use the features of different types of items for image rotation analysis.

To improve system efficiency, to expedite processing, and to improve data transmission, it can be advantageous to compress the captured images. In some embodiments, multiple captured images of mail items, can be compressed using binary data of each row of pixels of each of the captured images. This may take longer to compress the entire set of the captured images, may occupy more memory, and may take longer to transmit the compressed data over a communication network.

Some embodiments provide an improved data compression system and method by compressing digital data of a scanned image of a mailpiece or parcel or compressing digital data of stacked scanned images of mailpieces or parcels, simultaneously or in a single compression operation. In this way, it is possible to significantly improve a compression efficiency, a communication efficiency of compressed data and save a memory space. These savings are magnified when scanned items are similar to each other, and when image compression includes network transmission between different processing equipment. The image processing and compression systems and methods of the present disclosure can have applicability in a variety of applications other than item processing. For example, the systems and methods described herein can be used in video applications, such as video compression, video streaming, and the like.

Figure 4:
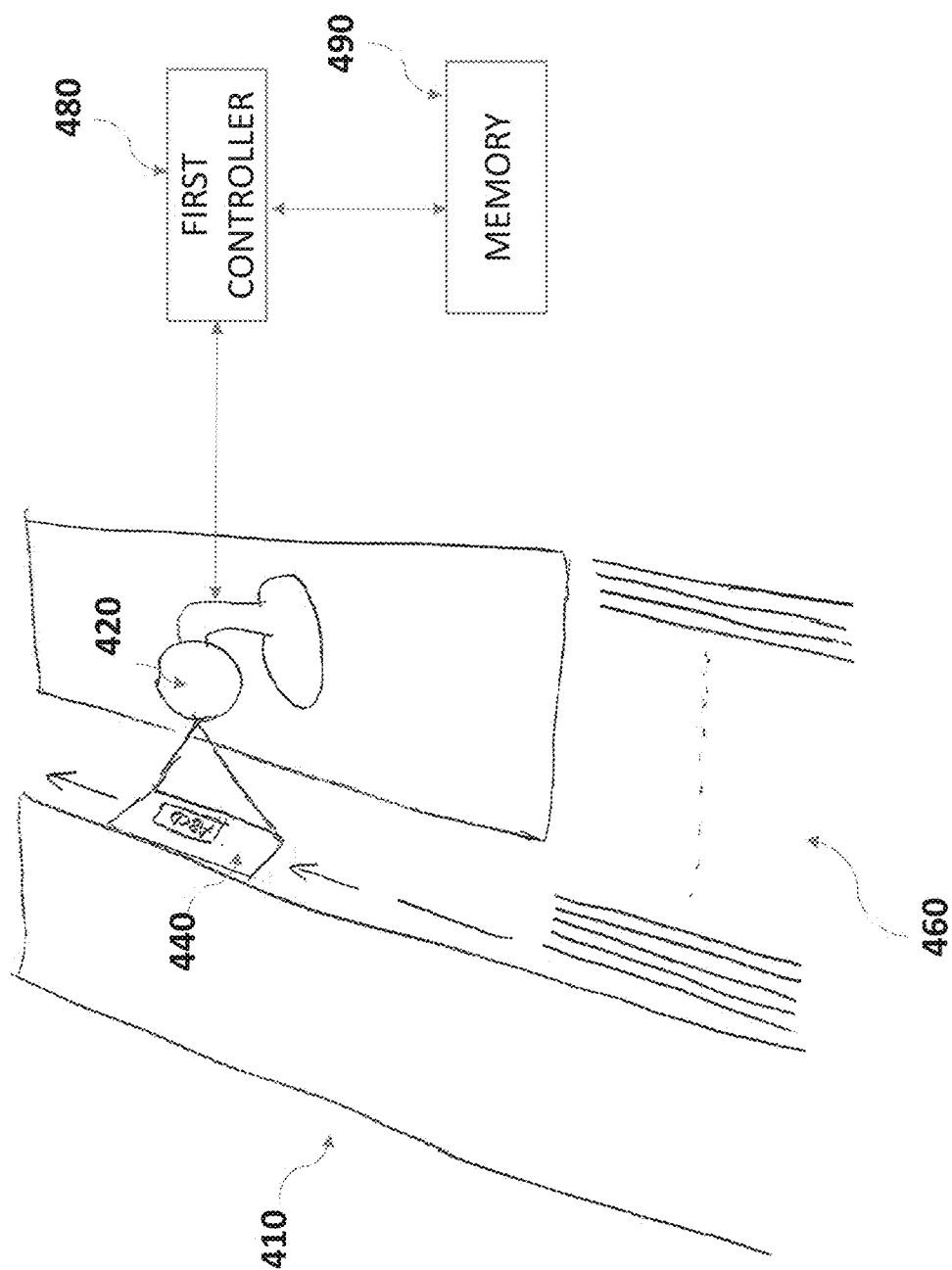
FIG. 4 illustrates an item processing system for processing flat items according to some embodiments.

FIG. 4 illustrates an item processing system 40 for processing items according to some embodiments. The item processing system 40 may be part of the item processing equipment 100 of FIG. 1 or can be separately provided, for example, being disposed adjacent thereto. The item processing system 40 may include a delivery bar code sorter (DBCS available from USPS) or other type of equipment 410, an optical scanner (an imaging device, an image capturing device or a reader) 420, a first controller 480 and a memory 490. The item processing system 40 shown in FIG. 4 is merely an example processing system, and certain elements may be modified or removed, and/or other elements or equipment may be added. Although only one optical scanner is shown in FIG. 4, two or more optical scanners can be provided depending on the embodiment.

The equipment 410 may include an automated letter sorting machine used for letter-size mails that are barcoded. The equipment 410 may include a conveyor belt (not shown) that moves items from one location to another. Although FIG. 4 shows that the optical scanner 42 scans letters or flat items being conveyed by the equipment 410, the optical scanner 42 can also scan items such as parcels, residual mail, and the like. An item processing system for parcels is described in U.S. Patent Application Publication No. 2019/0028719 which is incorporated herein by reference in its entirety.

The equipment 410 may automatically sort a stack of mailpieces 460 by conveying each of them from one side to another in a way that the optical scanner 420 captures an image of a mailpiece 440 that is being conveyed. The optical scanner 420 may capture an entirety or a portion of one side of the mailpiece 440 facing the scanner 420. The optical scanner 420 may capture information relevant to mail processing and/or delivery including, but not limited to, names and addresses of senders and recipients, postages and barcodes, etc. The barcodes may include an intelligent mail package barcode (IMpb).

The captured image may include at least part of the images 200 and 300 shown in FIGS. 2 and 3. The optical scanner 420 may continuously and separately capture images of mailpieces being transported in front of the scanner 420. In some embodiments, the captured images or digital data thereof may be stored in the memory 490 being in data communication with the first controller 480. In other embodiments, the captured images or digital data thereof may be stored in a memory of the scanner 420 or a memory of the first controller 480. In other embodiments, the captured images or digital data thereof may be stored in a network memory such as a cloud or other device separately located from the elements 420, 480 and 490. The captured images or digital data thereof may also be transmitted to a receiving device via a communication network (wired or wireless). The digital data may include binary data. For example, "0" represents a white pixel and "1" represents a black pixel, or vice versa. Hereinafter, for the purpose of convenience, binary data will be described as an example of digital data.

The optical scanner 420 may be connected to the first controller 480 either by wire or wirelessly. In some embodiments, the optical scanner 420 may transmit uncompressed data of a captured image to the first controller 480. In other embodiments, the optical scanner 420 may transmit compressed data of the captured image to the first controller 480. When the optical scanner 420 transmits compressed data to the first controller 480, the optical scanner 420 may also send compression information to be used by the first controller 480 or other receiving device for decompressing the compressed data so as to reconstruct the original data. For example, the compression information may include a type of compression (e.g., variable length compression such as Huffman coding). The compression information may also include row identifier information such as row identifier bit(s) or item identifier bit(s) to be described with respect to FIGS. 5-7. The compression information may be included in the compressed data, for example, as a header thereof, or, may be separately sent to the first controller 480. In some embodiments, the optical scanner 420 may receive a control message from the first controller 480. The control message may include one or more of a type of compression method used to compress the captured image, parameters for capturing images of the item 440, such as the size of the image, the size of the field to be images, color mode for the image, number of pixels for the image, resolution for the image, or other information to configure the optical scanner 420 to capture the image.

Figure 5:
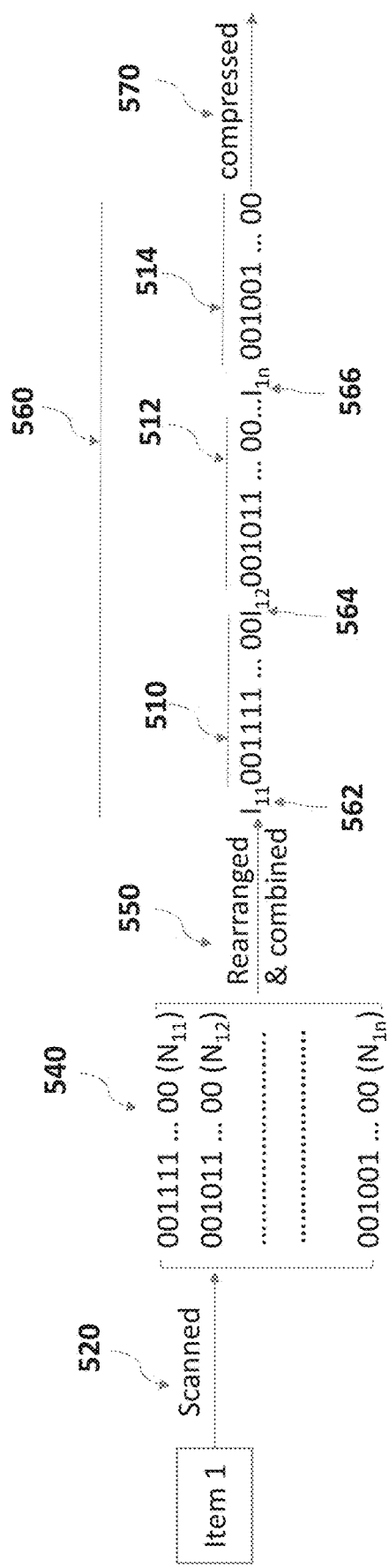
FIG. 5 is a conceptual diagram showing a data compression operation for a captured image of a mailpiece or parcel according to some embodiments.

FIG. 5 is a conceptual diagram showing a compression operation for a captured image of a mailpiece or parcel according to some embodiments. Referring to FIG. 5, Item 1 (such as the mailpiece 440) may be scanned by the optical scanner 420 of FIG. 4 while being conveyed in item processing equipment (step 520). The scanned image may be converted, for example, in the optical scanner 420 into a first set of (uncompressed) binary data 540. The binary data 540 shown in FIG. 5 is merely an example of binary values for the scanned image and can have other binary values. As shown in FIG. 5, the first set of binary data 540 may include an N×M matrix of binary values or N rows of binary values, where N and M are a natural number. The size of N and M may depend on a desired degree of resolution of the scanned image or the resolution specification of the optical scanner 420. The higher the resolution, the bigger the values for N and M are. For the purpose of convenience, FIG. 5 will be described using N rows of binary values (N11, N12, ..., N1$n$).

The first set of binary data 540 may be rearranged and combined with each other in order to generate a first pre-compression set of binary data 560 (step 550). In some embodiments, the first set of binary data 540 may be horizontally combined to each other to generate a single row of the first pre-compression set of binary data 560 (step 550) to be compressed simultaneously or to be compressed together in a single compression operation. In other embodiments, the first set of binary data 540 may be combined into a single file including the first pre-compression set of binary data 560 either in a single row or multiple rows to be compressed together. For example, the pre-compression set of binary data 560 may have a single row of binary values where the N rows of binary data 540 are arranged horizontally adjacent to each other. The pre-compression set of binary data 560 may also be formed into a single file including all of the binary values of the first pre-compression set of binary data 560 regardless of whether they are arranged in a single row or multiple rows, as long as all of the binary values included in the single file are simultaneously compressed or compressed together in a single compression operation (even if not simultaneously).

The pre-compression set of binary data 560 may include a first row portion 510, a second row portion 512, . . . , an nth row portion 514 whose binary values are respectively the same as the first, second and nth rows (N1$l$, N12, . . . , N1$n$) but arranged and combined together (e.g., horizontally combined or included in a single file). In some embodiments, the first pre-compression set of binary data 560 may also include row identifier information. The row identifier information may include one or more of row identifier bits 562 (I1l), 564 (I12), . . . , 566 (I1$n$) positioned in front of the first digit of the binary data of each row portion (510, 512, . . . , 514). For example, the row identifier bits 562 (I1l), 564 (I12), . . . , 566 (I1$n$) may be positioned immediately before the binary data of each row portion (510, 512, . . . , 514). Once the first pre-compression set of binary data 560 is compressed, the row identifier bits 562, 564 and 566 can be used by a receiving device or a decompression device to decompress the compressed binary data so as to reconstruct the first set of binary data 540 shown in FIG. 5.

In some embodiments, as shown in FIG. 6A, the row identifier bits 562-566 may be positioned immediately after the binary data of each row portion (510, 512, . . . , 514). In other embodiments, as shown in FIG. 6B, a single row identifier bit such as a row identifier bit 568 (I$n$) that is positioned in front of the entire set of binary data for Item 1. In other embodiments, as shown in FIG. 6C, the row identifier bit 568 (I$n$) may be positioned at the end of the entire set of binary data for Item 1. The row identifier bit 568 may include information regarding the number of binary digits for each row portion (510, 512, . . . , 514) for decompression purpose.

In some embodiments, the first pre-compression set of binary data 560 may not include a row identifier bit (or an image or item identifier bit). In these embodiments, a compression device may send to a decompression device information regarding the number of binary digits of each row portion (510, 512, . . . , 514). The compression device may also store information regarding the number of binary digits of each row portion (510, 512, . . . , 514) in a memory (e.g., a network memory) that can be accessed by the decompression device in order to decompress the compressed data.

Referring back to FIG. 5, the combined first pre-compression set of binary data 560 may be compressed (570). As discussed above, the first pre-compression set of binary data 560 may be compressed together (e.g., simultaneously, or together in a single compression operation). The compression may be performed using a variable length compression method such as Huffman coding. The Huffman scheme involves the use of a variable length code word table to represent an uncompressed series of binary digits as a much shorter code word (to be described in more detail below).

In some embodiments, no binary data of each row portion (510, 512, . . . , 514) may be compressed individually or separately. In some embodiments, the entire set of the first binary data (first pre-compression set of binary data 560) may be simultaneously compressed or compressed together in a single compression operation. In other embodiments, binary data of two or more consecutive row portions of the first set of binary data 540 may be simultaneously compressed or compressed together in a single compression operation. For example, compression may be performed on binary data of the first and second row portions 510 and 512, binary data of third and fourth row portions, binary data of first to third row portions, or binary data of fourth to sixth row portions, etc. By compressing at least two consecutive rows of pixel data instead of a single row of pixel data, various embodiments can significantly improve a compression efficiency, particularly, when captured image portions or binary data of row portions are similar to each other and a large volume of captured images are compressed.

Figure 7:
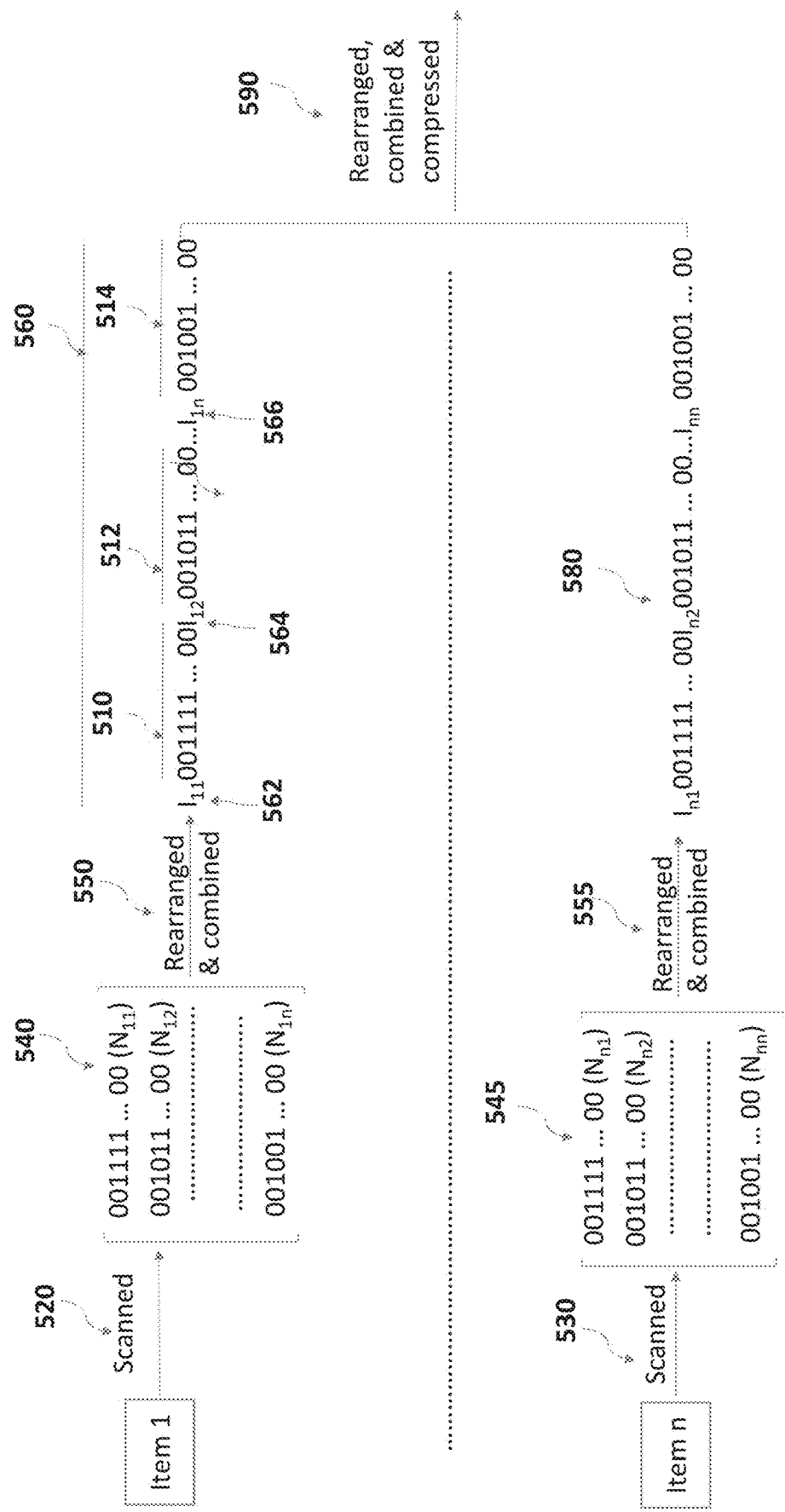
FIG. 7 is a conceptual diagram showing a data compression operation for captured images of mailpieces or parcels according to other embodiments.

FIG. 7 is a conceptual diagram showing a data compression operation for captured images of mailpieces or parcels according to other embodiments. Referring to FIG. 7, Item 1 through Item n may be sequentially scanned by the scanner 420 of FIG. 4 (steps 520, . . . , 530). As the scanned image for Item 1 is converted into the first set of binary data 540 as shown in FIG. 5, the scanned images for Item 2 through Item n may also respectively be converted into a second set of binary data (not shown) through an nth set of binary data 545. Furthermore, as the first set of binary data 540 is rearranged and combined to generate the first pre-compression set of binary data 560, the second set of binary data through the nth set of binary data 545 may also be rearranged and combined to respectively generate a second pre-compression set of binary data (not shown) through an nth pre-compression set of binary data 580 (steps 550, . . . , 555).

In some embodiments, as shown in FIG. 7, the first pre-compression set of binary data 560 through the nth pre-compression set of binary data 580 may be rearranged and combined, and subsequently compressed using, for example, a variable length compressing method (step 590). Similarly to the row identifier bits 562-566, item identifier bits (not shown) may be used to identify item numbers when the compressed data is decompressed so as to reconstruct the original pixel data 540, . . . , 545. For example, the item identifier bits may be positioned at the beginning or end of each item binary data set, or at the beginning or end of the entire set of binary data for Items 1 through n. Similarly to the row identifier bits, the combined binary data (step 590) may not include item identifier information. In these embodiments, a compression device may send to a decompression device or store information regarding the number of binary digits of each item portion for decompression purpose.

In other embodiments, pre-compression sets of binary data for at least two consecutive items may be combined and subsequently compressed simultaneously or compressed together in a single compression operation. For example, the pre-compression set of binary data for Items 1 and 2, Items 3 and 4, Items 5-7 or Items 8-11, etc., may be rearranged and combined, and subsequently compressed together.

In some embodiments, the rearranging and combining of the binary data 540 and compression of the rearranged/combined binary data 560 may be performed by the first controller 480. In these embodiments, the first controller 480 of FIG. 4 may function as the above described compression device and receive the first set of binary data 540 (uncompressed) for Item 1 from the optical scanner 420. The first controller 480 may store the compressed data in the memory 490 that can be accessed by a decompression device. The first controller 480 may also send the compressed data to a decompression device. The first controller 480 may further process the uncompressed data before compressing the binary data. The first controller 480 may also encrypt the compressed data before storing or transmitting.

In other embodiments, the rearranging and combining of the binary data 540 and compression of the rearranged binary data 560 may be performed by a processor of the optical scanner 420. The optical scanner 420 may also encode the compressed data. In these embodiments, the first controller 480 may decompress (and decode, if necessary) the compressed data received from the optical scanner 420. Once the image data is reconstructed, the first controller 480 may analyze the image data. The analysis may include measuring the item or detecting a computer readable code or may perform optical character recognition (OCR) of the image data of part or all of an item in order to identify various characteristics of the item, such as class of service, addressee, and/or delivery end point. If the first controller 480 sends compressed data to a decompression device such as a second controller 820 (see FIG. 8), the second controller 820 may perform the above decompression and additional functions.

In some embodiments, the first controller 480 may also perform detailed image analysis to remove or adjust images requiring such additional processing to obtain the information of interest despite defects in the form or content of the image. For example, the first controller 480 may include specialized graphics libraries or machine learning models to extract information from an image file including image data showing an item. The information may include object recognition of items represented by the image data. In other embodiments, the function of the first controller 480 described in this paragraph may be performed in a separate image processing server (not shown). In other embodiments, the first controller 480 or the optical scanner 420 may sort or group the captured image data before compressing the binary data (to be described in more detail with reference to FIG. 11).

In some embodiments, in performing the compression, at least one of the optical scanner 420 or the first controller 480 may include a code word table. A code word table generally identifies sequences of values that can be represented using a smaller value. For example, assume a black and white pixel can be represented using "1" for black and "0" for white. In such instances, it may be common to have a particular sequence of white pixels, such as when imaging an envelope. Rather than including a sequence of "O's" for the sequence, a code word may be assigned to represent the string with a single, smaller value (e.g., "32"). Thus, in the compressed and encrypted image file, "32" will be included rather than the sequence of "0's". TABLE 1 below is an example code word table that may be implemented to encode specific pixel sequences (e.g., run lengths).

TABLE 1

| White run length | Code word | Black run length | Code word |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |

TABLE 1-continued

| White run length | Code word | Black run length | Code word |
|---|---|---|---|
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |
| 18 | 0100111 | 18 | 0000001000 |
| 19 | 0001100 | 19 | 00001100111 |
| 20 | 0001000 | 20 | 00001101000 |
| 21 | 0010111 | 21 | 00001101100 |

Figure 8:
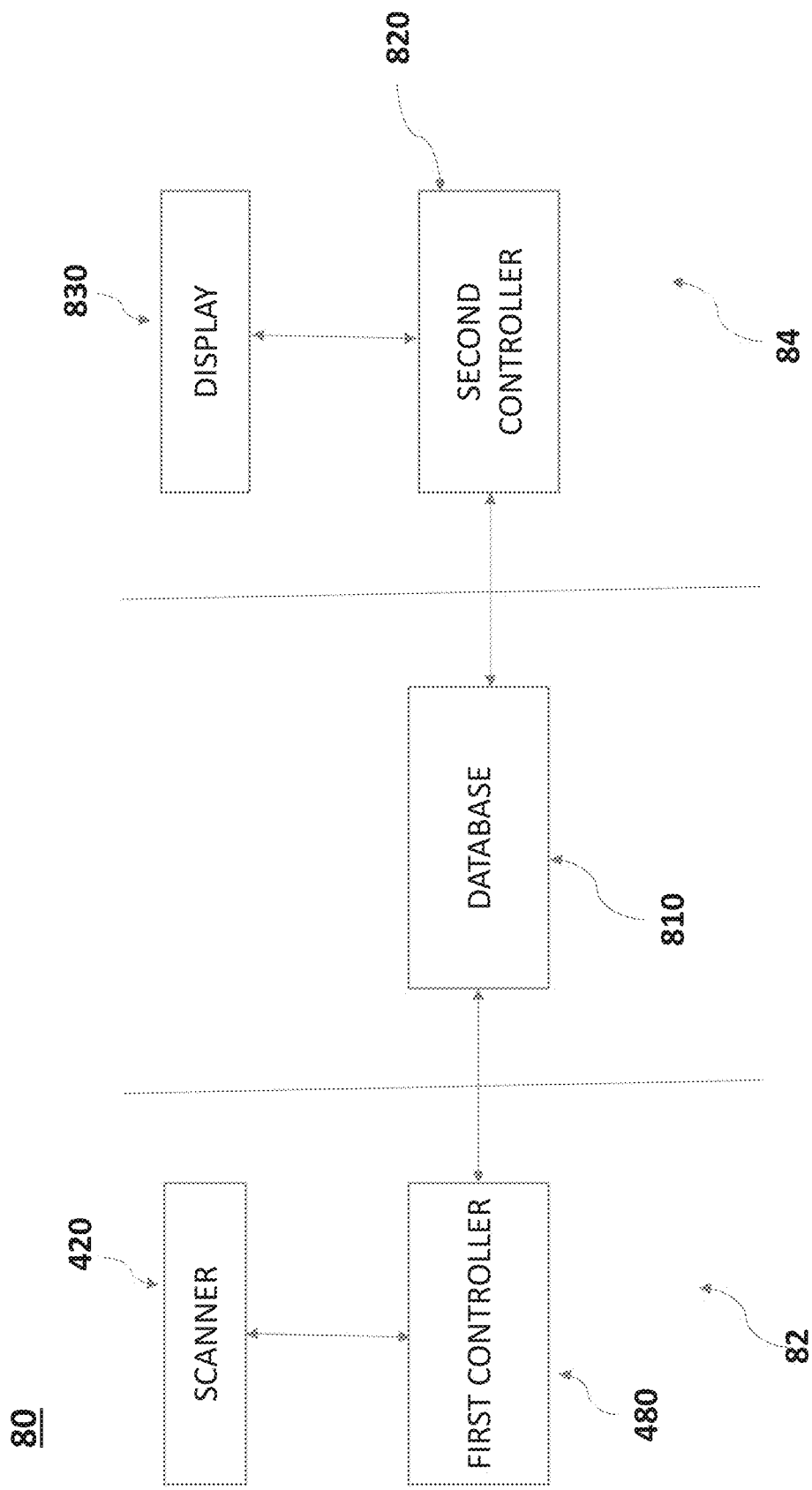
FIG. 8 is a block diagram of a system for compressing data for a captured image of a mailpiece or parcel and decompressing the compressed data according to some embodiments.

FIG. 8 is a block diagram of a system 80 for compressing binary data and decompressing the compressed data according to some embodiments. FIG. 8 is merely an example block diagram of the system 80, and certain elements may be removed, other elements added, two or more elements combined or one element can be separated into multiple elements depending on the specification and requirements.

The system 80 may include the first controller 480, the scanner 420, a database 810, a second controller 820 and a display 830. The first controller 480 and the scanner 420 may be located in a compression/transmission side 82. The second controller 820 and the display 830 may be located in a decompression/receiving side 84. In some embodiments, the database 810 may be located between the compression/transmission side 82 and the decompression/receiving side 84. In these embodiments, the database 810 may belong to neither of the sides 82 and 84. In other embodiments, the database 810 may belong to either of the compression/transmission side 82 and the decompression/receiving side 84.

In some embodiments, the compressed data may be stored locally in the compression/transmission side 82 or stored in the database 810. In other embodiments, the compressed data may be transmitted to the decompression/receiving side 84 either directly or through one or more of intermediate elements (not shown) between the compression/transmission side 82 and the decompression/receiving side 84.

The compression/transmission side 82 may store the compressed data (and encrypted data, if necessary) in the database 810 and/or transmit the compressed/encrypted data to the decompression/receiving side 84. The second controller 820 may then generate the raw image by converting the compressed/encrypted sequences included in the compressed image file to the original pixel information included in the raw image. The raw image may then be provided for further processing such as dynamic configuration of processing equipment based on the item shown in the image, tracking an item as it is routed to a final destination, or the like. The reconstructed image can be displayed on the display 830.

Figure 9:
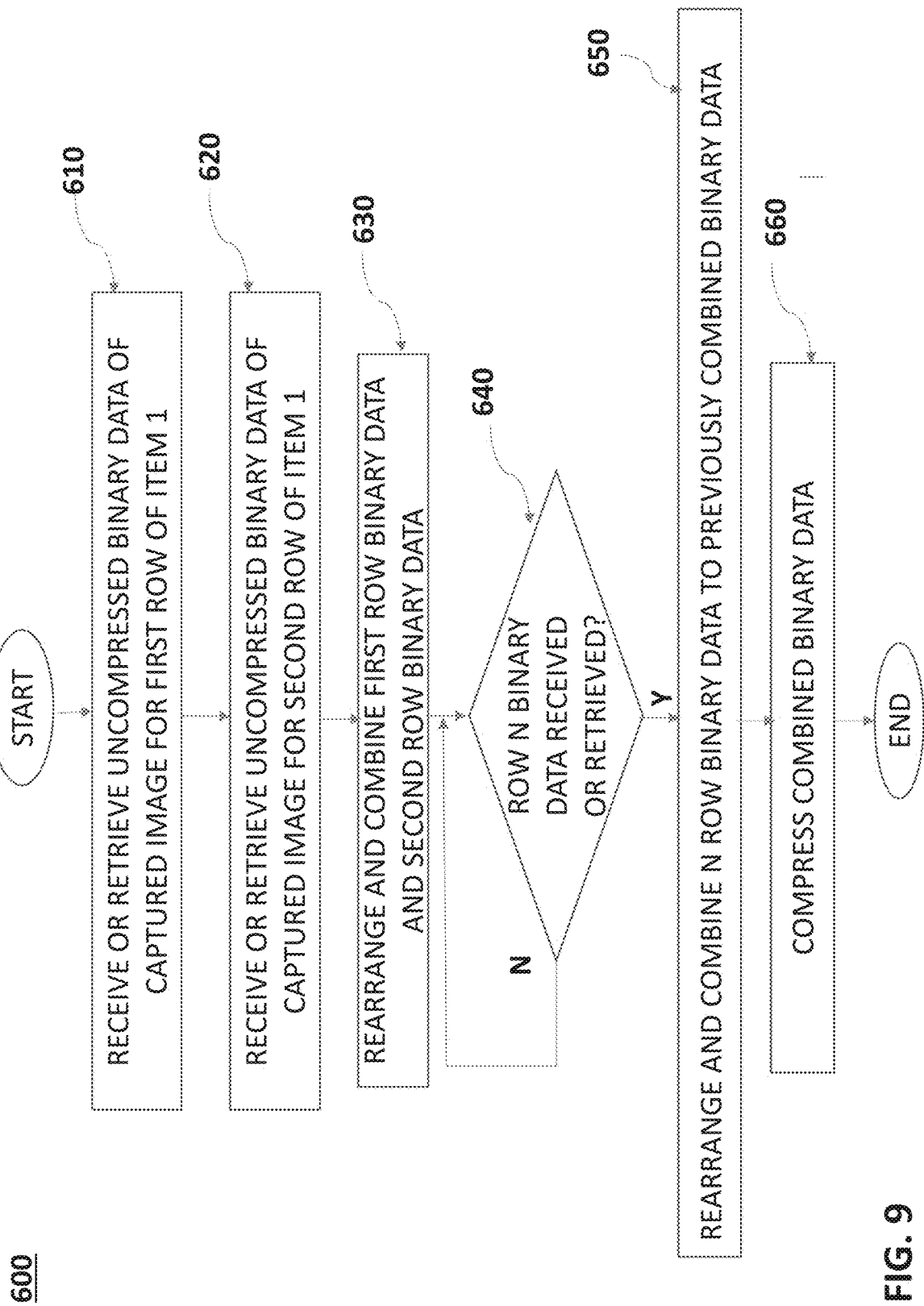
FIG. 9 is a process flow diagram of a method for compressing binary data of n rows of Item 1 according to some embodiments.

FIG. 9 is a process flow diagram 600 of a method for compressing binary data of n rows of Item 1 according to some embodiments. The process flow diagram 600 may be performed by at least one of the optical scanner 420 and the first controller 480. The process flow diagram 600 may also be performed by a computing device being in data communication with at least one of the optical scanner 420 and the first controller 480. Although the process flow diagram 600 is described herein with reference to a particular order, in various embodiments, states herein may be performed in a different order, or omitted, and additional states may be added. The same may apply to the processes 700 and 1000-1200 shown in FIGS. 10-13.

For the purpose of the convenience, the description will be made based on the first controller 480 performing the process flow diagram 600. In state 610, the first controller 480 may receive from the optical scanner 420 or retrieve from a memory uncompressed binary data of the captured image for the first row of Item 1. In state 620, the first controller 480 may receive from the optical scanner 420 or retrieve from the memory uncompressed binary data of the captured image for the second row of Item 1. In state 630, the first controller 480 may rearrange and combine the first row binary data and the second row binary data. It is determined whether the first controller 480 has received or retrieved uncompressed binary data of the captured image for the nth row of Item 1 (state 640). If it is determined in state 640 that the first controller 480 has not received or retrieved uncompressed binary data of the captured image for the nth row of Item 1, the state 640 may repeat until all of the n rows of data are received or retrieved. If it is determined in state 640 that the first controller 480 has received or retrieved uncompressed binary data of the captured image for the nth row of Item 1, the first controller 480 may combine the nth row binary data (N1$n$) to the previously combined binary data (e.g., N11N12 . . . N1$n$−1) to generate the single row pre-compression set of binary data 560 (or single file thereof) as shown in FIG. 5 (state 650). In some embodiments, the first controller 480 may simultaneously receive or retrieve all of the n rows of binary data, for example, in one state or operation. In state 660, the first controller 480 may simultaneously compress the combined binary data. Similar portions of images for various items can be compressed or identified using a code word and need only be stored once in the compressed file, rather than having an instance of the code word for each similar data in each image. The location of the similar data can be identified based on location in the image (Nth row data) and the number of the item being imaged (In). As discussed above, the combined binary data may include row identifier digits 562-566 for decompression purpose.

Figure 10:
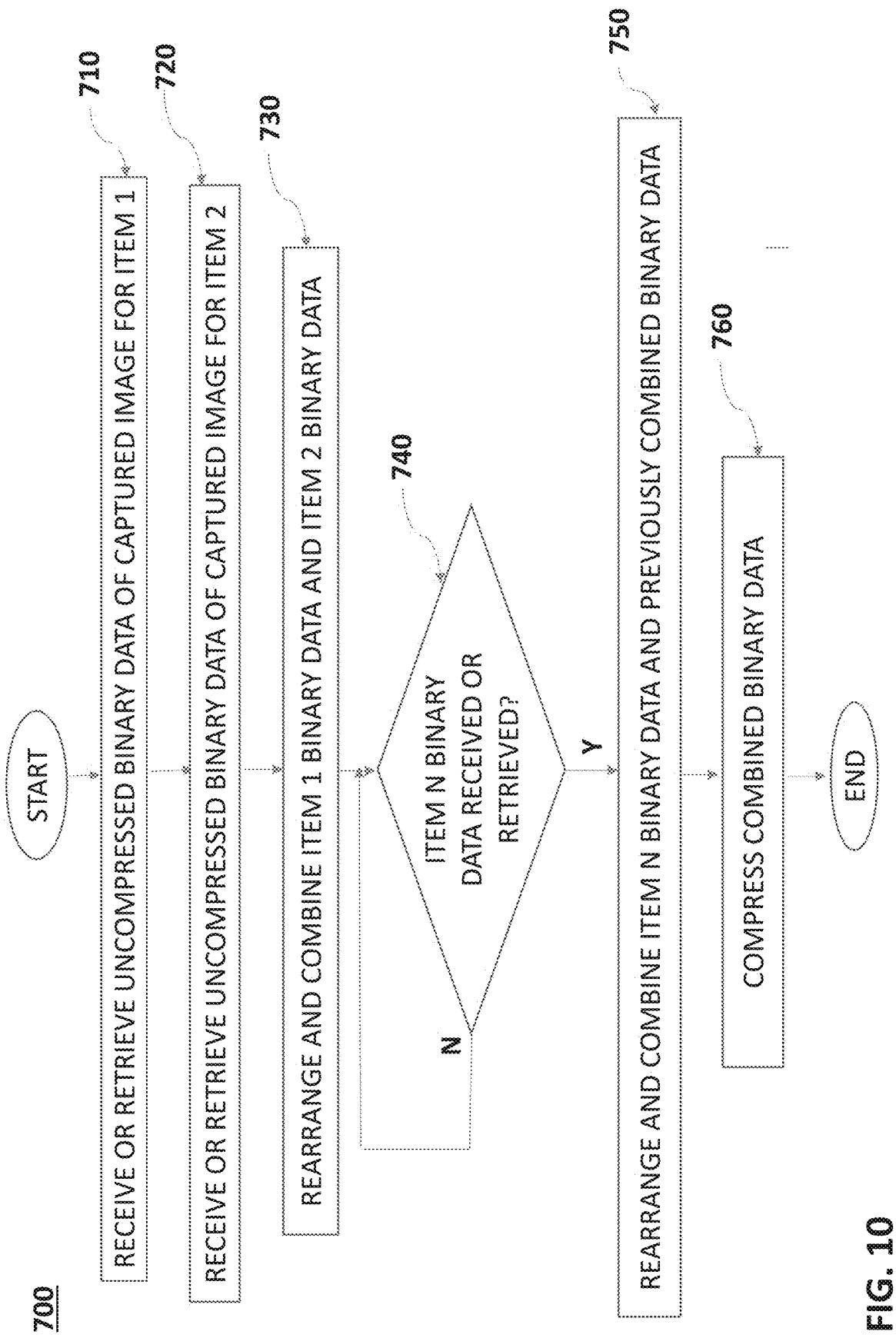
FIG. 10 is a process flow diagram of a method for compressing binary data of n items according to some embodiments.

FIG. 10 is a process flow diagram 700 of a method for compressing binary data of n items according to some embodiments. Although the process flow diagram 700 may be performed by at least one of the optical scanner 420 and the first controller 480, for the purpose of the convenience, the description will be made based on the first controller 480 performing the process flow diagram 700. This may apply to FIG. 11.

In state 710, the first controller 480 may receive from the optical scanner 420 or retrieve from a memory uncompressed binary data of the captured image for Item 1. In state 720, the first controller 480 may receive from the optical scanner 420 or retrieve from the memory uncompressed binary data of the captured image for Item 2. In state 730, the first controller 480 may rearrange and combine the Item 1 binary data and the Item 2 binary data. It is determined whether the first controller 480 has received or retrieved uncompressed binary data of the captured image for the Item n (state 740). If it is determined in state 730 that the first controller 480 has not received or retrieved uncompressed binary data of the captured image for the Item n, the state 740 may repeat until the n Item binary data is received. If it is determined in state 730 that the first controller 480 has received or retrieved uncompressed binary data of the captured image for the Item n, the first controller 480 may combine the Item n binary data (In) to the previously rearranged/combined binary data (e.g., I1I2 . . . In−1) so as to generate the pre-compression set of binary data 590 as shown in FIG. 7 (state 750). Here, In represents binary data of an nth item, where n is a natural number. In state 760, the first controller 480 may simultaneously compress the combined binary data, or compress the combined binary data together in a single compression operation. As discussed above, the combined binary data may include row identifier digits 562-566 and item identifier digits for decompression purpose.

Figure 11:
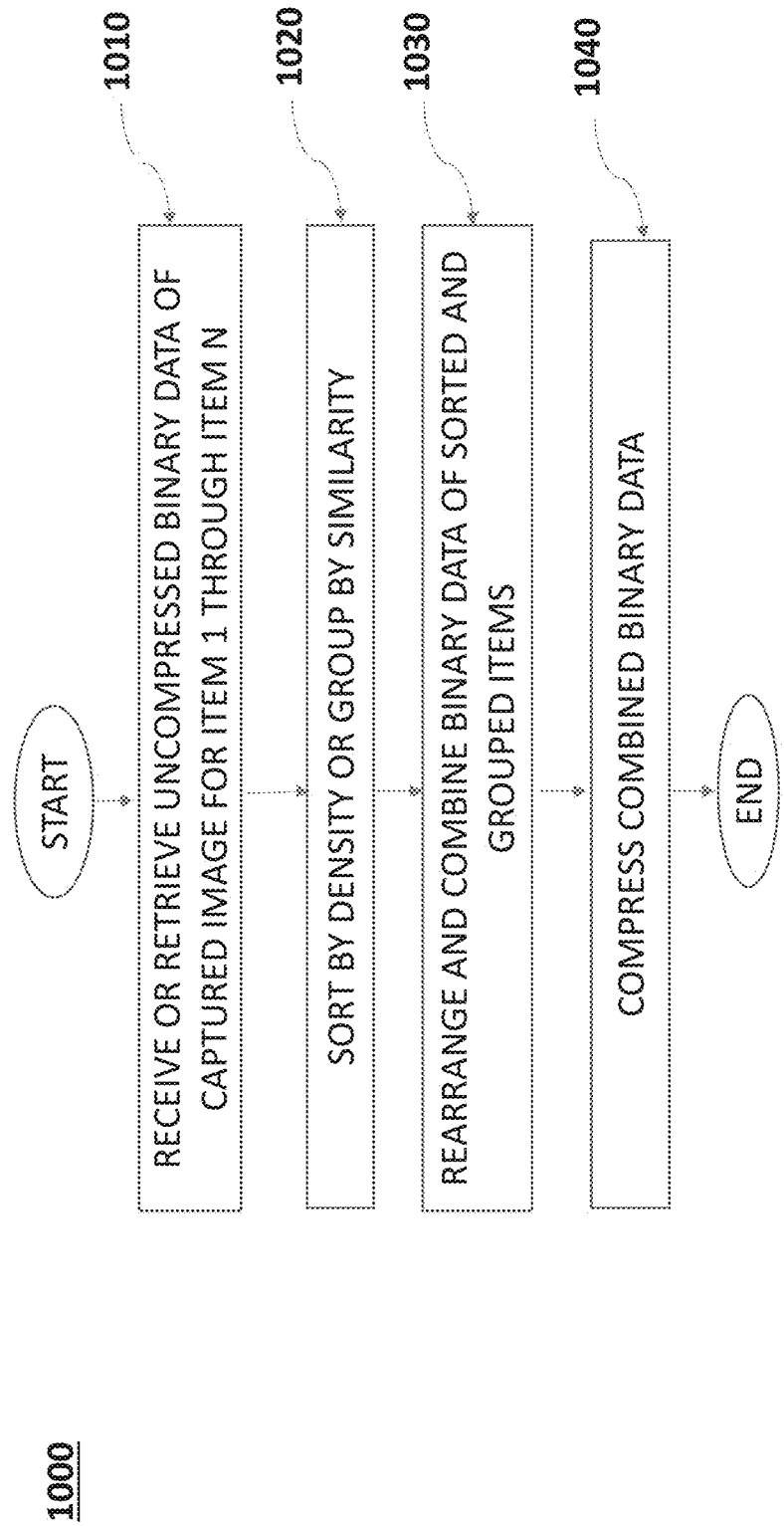
FIG. 11 is a process flow diagram of a method for compressing binary data of n items according to other embodiments.

FIG. 11 is a process flow diagram 1000 of a method for compressing binary data of n items according to some embodiments. In state 1010, the first controller 480 may receive from the optical scanner 420 or retrieve from a memory uncompressed binary data of the captured images for Item 1 through Item n. In state 1020, the first controller 480 may sort the uncompressed binary data by density or group the uncompressed binary data by similarity. For example, the first controller 480 may analyze a pixel density of the uncompressed binary data of the captured Items 1 through N to determine the degree of the pixel density, and sort the uncompressed binary data based on the determined degree of the pixel density. In some embodiments, when there is more information (text, image) in the capture image or binary data of items, those items may be determined more dense than other items having less information. In other embodiments, the first controller 480 or the optical scanner 420 may perform the sorting or grouping based on the captured image data before compressing the binary data.

The first controller 480 or the scanner 420 may also analyze a similarity of captured images or uncompressed binary data, and determine the degree of similarity of the captured images or binary data. For example, the same type of mail items such as letters may be determined to be similar to each other, and thus grouped together. Similarly, parcels may be determined to be similar to each other, and thus grouped together. When flat items and non-flat items are mixed, the flat items may be grouped together, and the non-flat items may be grouped together. When items having different sizes are mixed, same or similar sized items may be grouped together. In other embodiments, among the same type of mail items, certain sub-items can be grouped together. For example, regular mail letters, first class mail letters and priority mail letters can be respectively grouped into a regular mail letter group, a first class mail letter group and a priority mail letter group. By arranging items by similar type, the image compression can be improved by having similar locations of the images have the same image information. For example, with envelopes, the same rows of data or pixels for multiple images are likely to be the same. Or in other words, the images are likely to have white space in the same location. Thus, the rows or columns of binary data for each image can be compressed using a code word or other similar compression, and then the same code word or compression method can be assigned to the same locations in multiple images. The compressed data can signify that a particular compression code word or other compression can apply to the same section, such as a row, column, array, etc., in multiple images, thus reducing the size of the compressed data file.

In state 1030, the first controller 480 may rearrange and combine binary data of the sorted items and combine binary data of the grouped items. In state 1040, the first controller 480 may simultaneously compress the combined binary data or compress the combined binary data together in a single compression operation. As discussed above, the combined binary data may include row identifier digits 562-566 and item identifier digits for decompression purpose. Various embodiments can significantly improve a compression efficiency, particularly, when there are more items sorted or more items grouped together.

Figure 12:
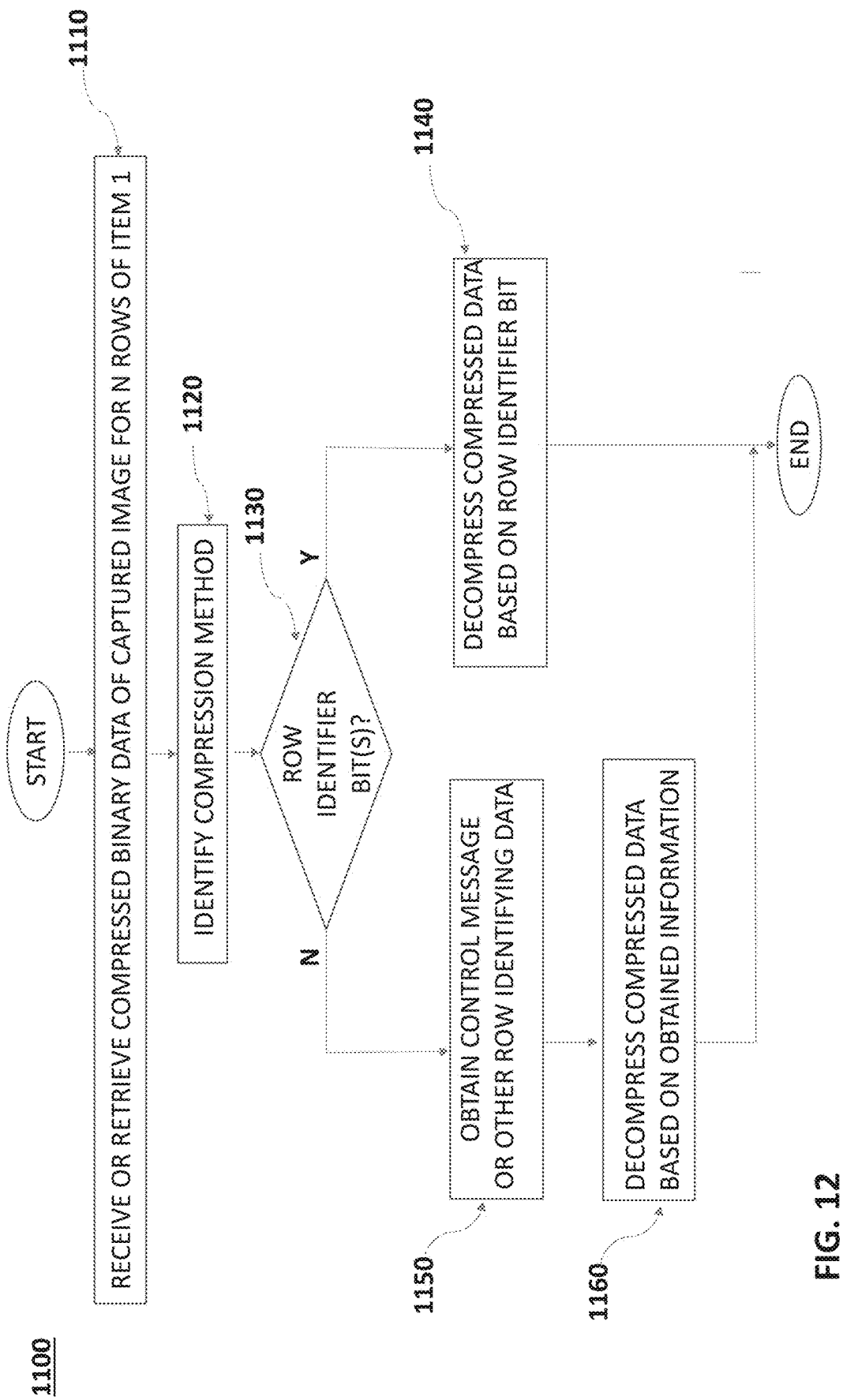
FIG. 12 is a process flow diagram of a method for decompressing compressed binary data of n rows of Item 1 according to some embodiments.

FIG. 12 is a process flow diagram 1100 of a method for decompressing compressed binary data of n rows of Item 1 according to some embodiments. The process flow diagram 1100 can be performed by the second controller 820. In state 1110, the second controller 820 may receive from the first controller 480 or retrieve from the database 810 compressed binary data of the captured image for n rows of Item 1.

In state 1120, the second controller 820 may identify the compression method used to compress the binary data. In some embodiments, the compression method information may be stored on the database 810 or a local memory of the second controller 820. In some embodiments, the information may be received from the first controller 480.

In state 1130, it is determined whether the compressed binary data includes row identifier bit(s) shown in FIGS. 5-6C. If it is determined in state 1130 that the compressed binary data includes row identifier bit(s), the second controller 820 may decompress the compressed binary data based on the row identifier bit(s) and the identified compression method (state 1140). If it is determined in state 1130 that the compressed binary data does not include row identifier bit(s), the second controller 820 may obtain a control message or other row identifying data relating to information of the binary data format used in compression (state 1150). In some embodiments, the second controller 820 may receive the control message and row identifying data from the first controller 480. In other embodiments, the control message and row identifying data may be transmitted together with the compressed data (either as a separate file or part of the compressed data) to the receiving side 84. In state 1160, the second controller 820 may decompress the compressed binary data based on the obtained information message and the identified compression method to reconstruct the original pixel data and image data to be displayed on the display 830.

Figure 13:
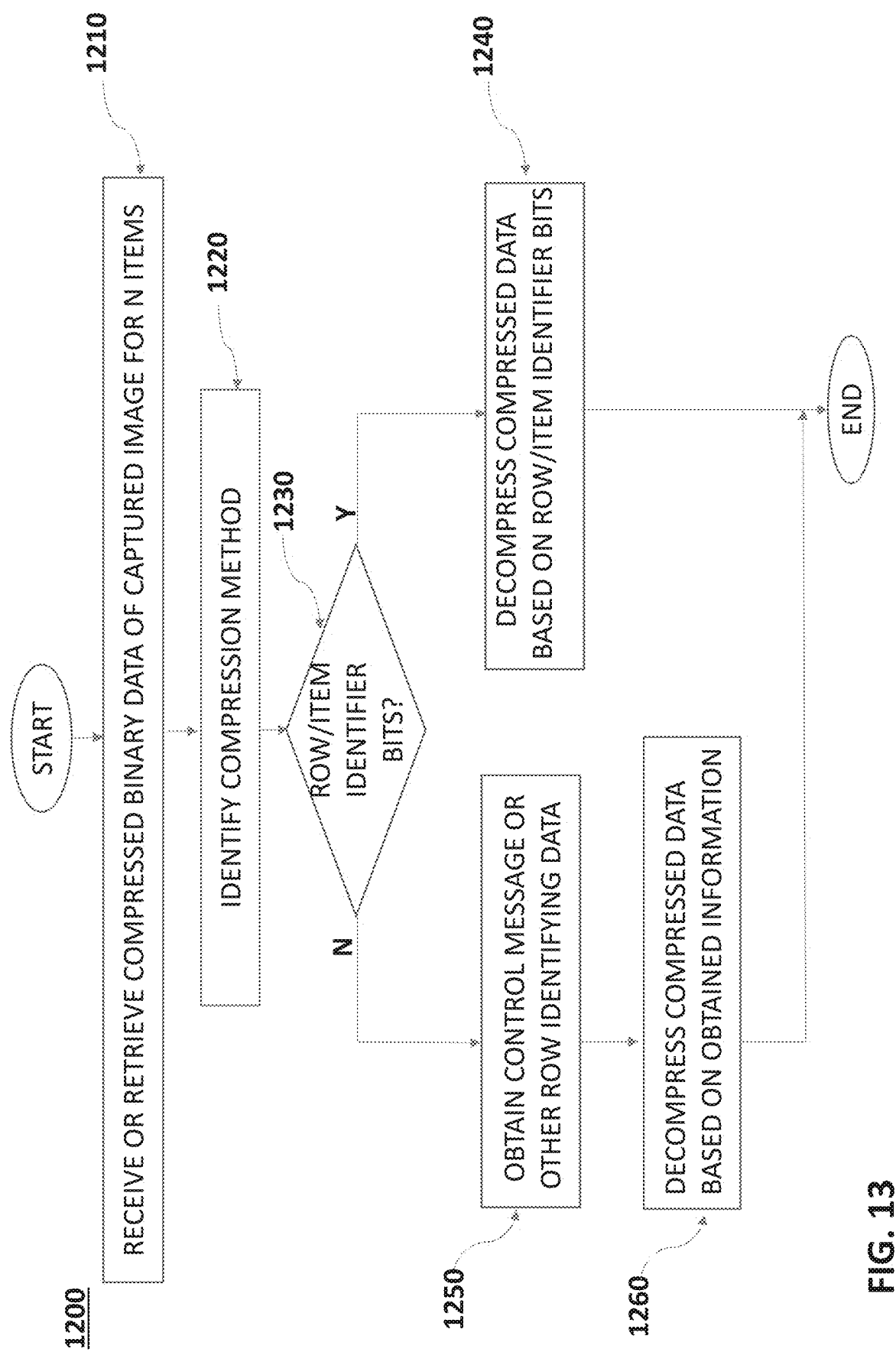
FIG. 13 is a process flow diagram of a method for decompressing compressed binary data of n items according to some embodiments.

FIG. 13 is a process flow diagram 1200 of a method for decompressing compressed binary data of n items according to some embodiments. The process flow diagram 1200 can be performed by the second controller 820. In state 1210, the second controller 820 may receive from the first controller 480 or retrieve from the database 810 compressed binary data of the captured image for n items. In state 1220, the second controller 820 may identify the compression method used to compress the binary data, similarly to state 1120 of FIG. 12. In state 1230, it is determined whether the compressed binary data includes row identifier bit(s) shown in FIGS. 5-6C. If it is determined in state 1230 that the compressed binary data includes row identifier bit(s), the second controller 820 may decompress the compressed binary data based on the row identifier bit(s) and the identified compression method (state 1240). If it is determined in state 1230 that the compressed binary data does not include row identifier bit(s), the second controller 820 may obtain a control message or other row identifying data relating to information of the binary data format used in compression (state 1250). In state 1260, the second controller 820 may decompress the compressed binary data based on the obtained information and the identified compression method.

Figure 14:
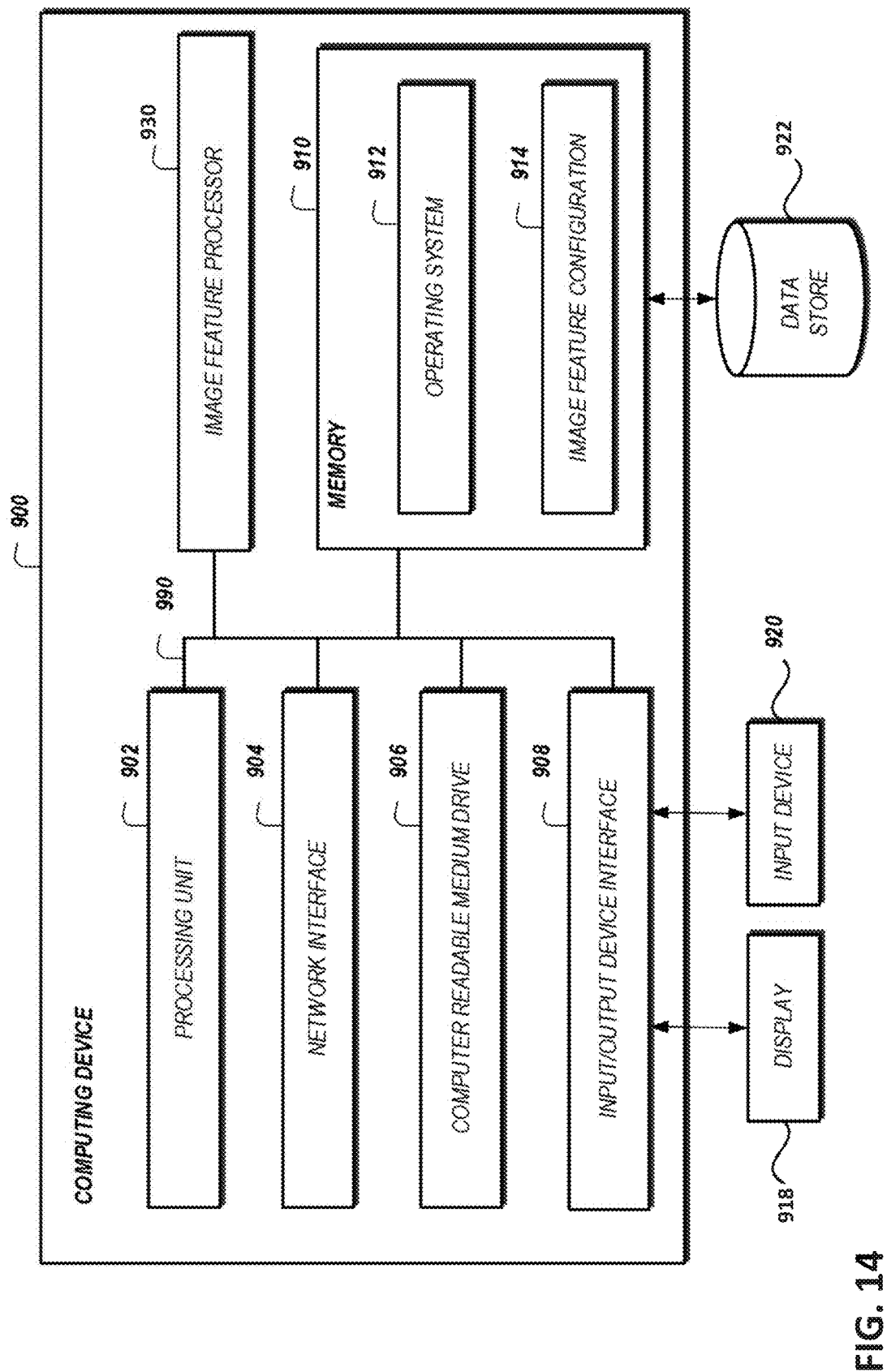
FIG. 14 is a block diagram of an example first or second controller illustrated in FIG. 8 according to some embodiments.

FIG. 14 is a block diagram of an embodiment of a computing device 900 for compressing binary data or decompressing the compressed data according to some embodiments. FIG. 14 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. The computing device 900 may implement the features of one or more of the optical scanner 420, the first controller 480, and the second controller 820.

The network interface 904 can provide connectivity to one or more networks or computing systems. The network interface 904 can receive information and instructions from other computing systems or services via the network interface 904. The network interface 904 can also store data directly to memory 910. The processing unit 902 can communicate to and from memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more embodiments. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 14. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method of decompressing a compressed digital data of a captured image of one or more items, the method comprising:
   receiving compressed digital data associated with a plurality of items, wherein the compressed digital data comprises a plurality of sets of digital data respectively corresponding to a plurality captured images of the plurality of items;
   identifying, at a processor circuit, a compression method of the compressed digital data;
   obtaining, at the processor circuit, item identifier information configured to provide a border of two adjacent ones of the plurality of sets of digital data; and
   decompressing, at the processor circuit, the compressed digital data based on the identified compression method and the item identifier information.

2. The method of claim 1, wherein the decompressing comprises:
   reconstructing original pixel data sets of the plurality of sets of digital data such that each of the reconstructed original pixel data sets comprises two or more rows of digital data.

3. The method of claim 1, wherein the obtaining comprises retrieving one or more item identifier bits from the compressed digital data.

4. The method of claim 1, wherein the obtaining comprises receiving a control message that contains the item identifier information over a communication network.

5. The method of claim 4, wherein the control message is included in the compressed digital data.

6. The method of claim 4, wherein the control message is received in a file separate from the compressed digital data.

7. The method of claim 1, wherein the compressed digital data is retrieved from a memory.

8. The method of claim 1, wherein the identifying comprises receiving the compression method over a communication network.

9. The method of claim 1, wherein the identifying comprises retrieving the compression method from a memory.

10. The method of claim 1, wherein the item identifier information comprises a plurality of image identifier bits disposed immediately before or after each of the plurality of sets of digital data.

11. A method of decompressing a compressed digital data of a captured image of one or more items, the method comprising:
    receiving compressed digital data associated with an item, wherein the compressed digital data comprises a set of digital data corresponding to a captured image of the item, and wherein the set of digital data comprises a plurality of sub-sets of digital data;
    identifying, at a processor circuit, a compression method of the compressed digital data;
    obtaining, at the processor circuit, item identifier information configured to provide a border of two adjacent ones of the plurality of sub-sets of digital data; and
    decompressing, at the processor circuit, the compressed digital data based on the identified compression method and the item identifier information.

12. The method of claim 11, wherein the decompressing comprises:
    reconstructing an original pixel data set of the set of digital data such that the reconstructed pixel data set comprises two or more rows of digital data.

13. The method of claim 11, wherein the obtaining comprises retrieving one or more item identifier bits from the compressed digital data or receiving a control message that contains the item identifier information over a communication network.

14. The method of claim 13, wherein the control message is included in the compressed digital data.

15. The method of claim 13, wherein the control message is received in a file separate from the compressed digital data.

16. The method of claim 11, wherein the item identifier information comprises a plurality of image identifier bits disposed immediately before or after each of the plurality of sub-sets of digital data.

17. A system for decompressing a compressed digital data of a captured image of one or more items, the system comprising:
- a memory circuit configured to store a compressed digital data associated with a plurality of items, wherein the compressed digital data comprises a plurality of sets of digital data respectively corresponding to a plurality captured images of the plurality of items; and
- a processor circuit in data communication with the memory circuit and configured to:
  - identify a compression method of the compressed digital data;
  - obtain item identifier information configured to provide a border of two adjacent ones of the plurality of sets of digital data; and
  - decompress the compressed digital data based on the identified compression method and the item identifier information.

18. The system of claim 17, wherein the processor is configured to reconstruct original pixel data sets of the plurality of sets of digital data such that each of the reconstructed original pixel data sets comprises two or more rows of digital data.

19. The system of claim 17, wherein the processor is configured to retrieve one or more item identifier bits from the compressed digital data or receive a control message that contains the item identifier information over a communication network.

20. The system of claim 17, wherein the item identifier information comprises a plurality of image identifier bits disposed immediately before or after each of the plurality of sets of digital data.

* * * * *